United States Patent [19]
Smoot

[11] Patent Number: 5,387,058
[45] Date of Patent: Feb. 7, 1995

[54] AIRLIFT RAILCAR DISCHARGE ADAPTOR

[75] Inventor: David K. Smoot, Overland Park, Kans.

[73] Assignee: Smoot Company, Kansas City, Kans.

[21] Appl. No.: 40,890

[22] Filed: Mar. 31, 1993

[51] Int. Cl.⁶ .............................................. B65G 53/08
[52] U.S. Cl. .................................. 406/145; 280/43.23; 406/39
[58] Field of Search .......................... 406/39, 145, 151; 105/241.2; 414/495; 280/43.13, 43.23

[56] References Cited

U.S. PATENT DOCUMENTS

| | | | |
|---|---|---|---|
| 1,257,704 | 2/1918 | Haupt | 280/43.13 |
| 2,418,302 | 4/1947 | Hornbrook | 406/145 |
| 2,813,640 | 11/1957 | Loomis | 406/89 |
| 3,014,485 | 12/1961 | Karlsson | 406/151 X |
| 3,627,157 | 12/1971 | Blatchly | 280/43.13 X |
| 3,635,492 | 1/1972 | Mauldin | 280/43.23 |
| 4,033,422 | 7/1977 | Benning | 414/495 X |
| 4,655,269 | 4/1987 | Hanser et al. | 280/43.23 X |
| 4,902,173 | 2/1990 | Hendee et al. | 406/145 |
| 5,125,771 | 6/1992 | Herman et al. | 406/145 X |
| 5,167,471 | 12/1992 | Kice et al. | 406/151 X |

FOREIGN PATENT DOCUMENTS 1075441  2/1960  Germany .......................... 280/43.13
189039  11/1922  United Kingdom .................. 406/39

Primary Examiner—David M. Mitchell
Attorney, Agent, or Firm—Litman, McMahon & Brown

[57] ABSTRACT

An airlift railcar discharge adaptor is designed for connection to a railroad car discharge opening for unloading pulverulent and granular material from the car. The adaptor includes a discharge chute and a discharge inlet mounted with a pair of wheels providing support and mobility. The wheels can be swiveled to allow precise maneuvering of the adaptor. A horizontally oriented rectangular discharge inlet connects with the chute and is adapted to be connected to the discharge outlet of the railroad car. A handle is connected to the adaptor. Each wheel is connected to a respective bell crank, which is, in turn, connected to a respective pneumatically operated cylinder. Each pneumatic cylinder is connected to an independent lever control conveniently positioned proximate the adaptor handle. The adaptor can be raised and lowered by manipulating the levers, each of which is connected to a three-way valve for charging the associated pneumatic cylinder. The adaptor can be moved, maneuvered, raised and lowered by a single workman from a standing position.

22 Claims, 2 Drawing Sheets

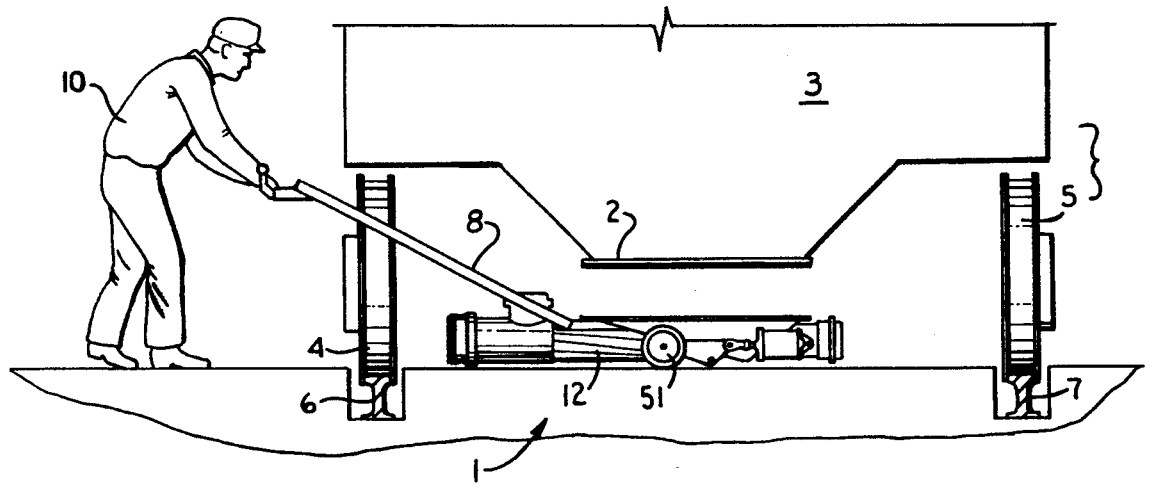
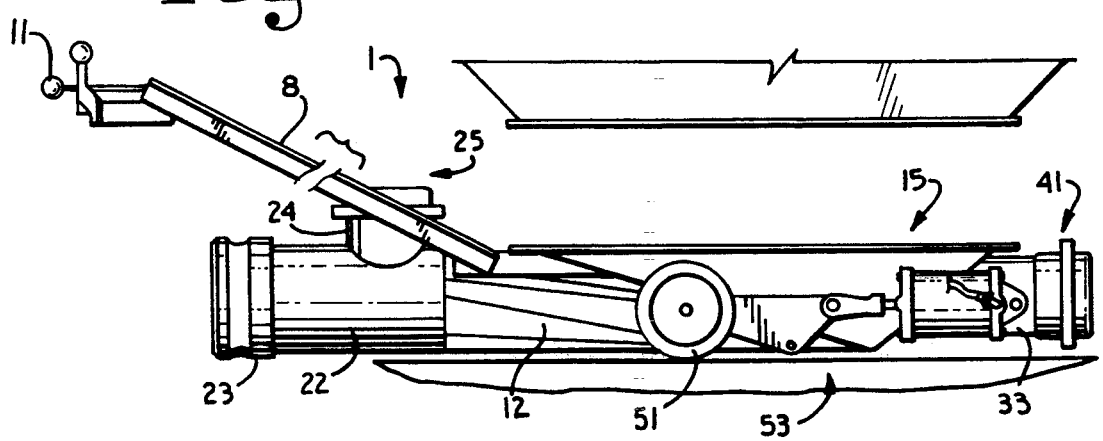
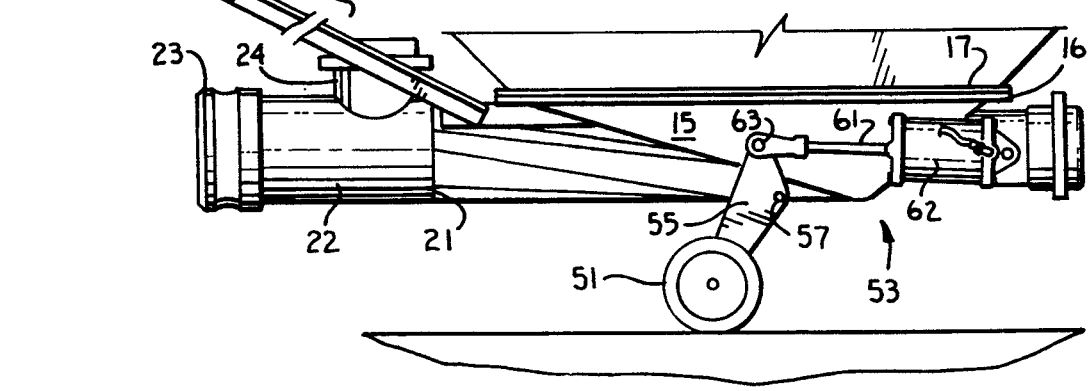

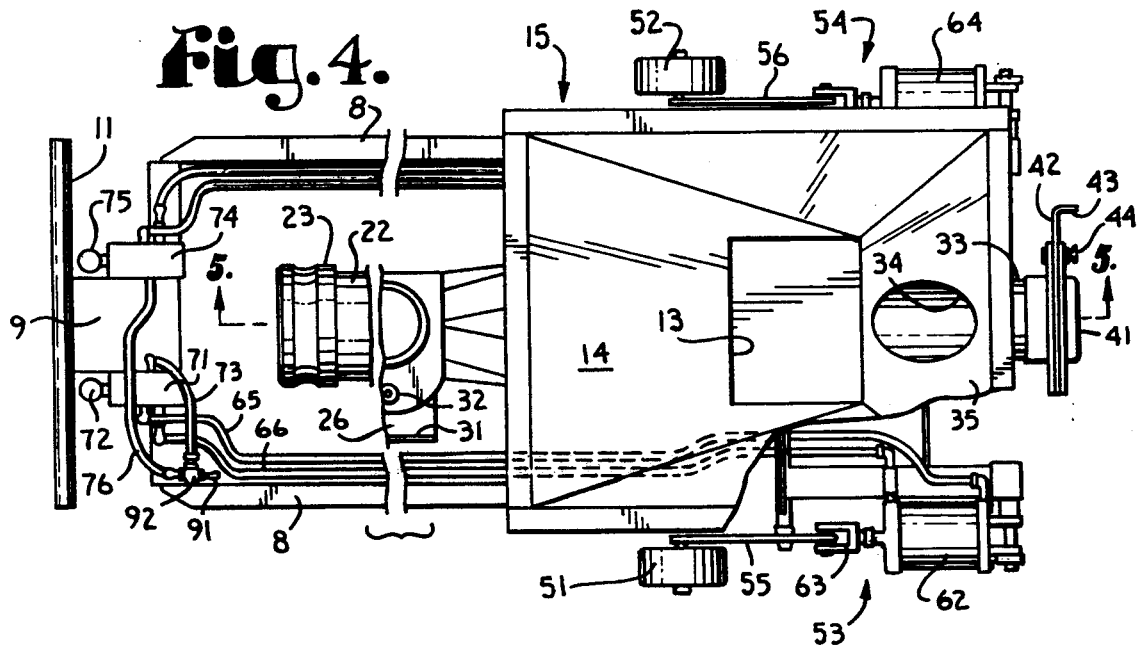
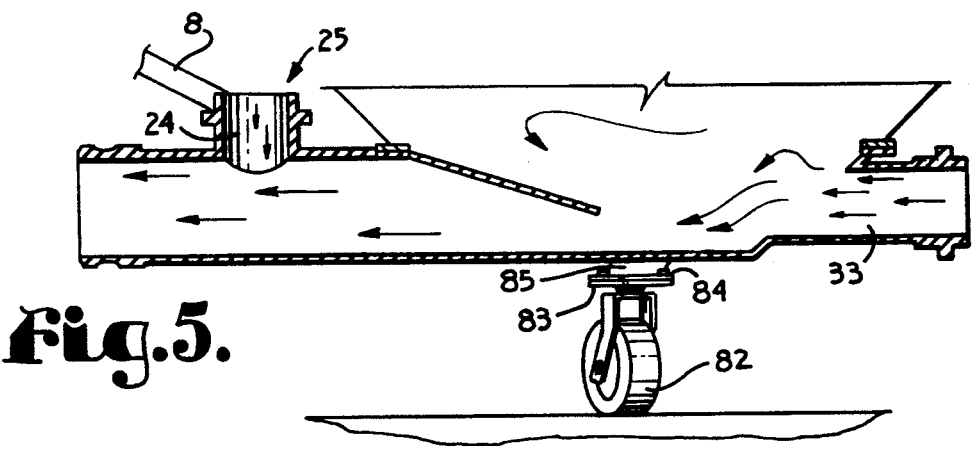
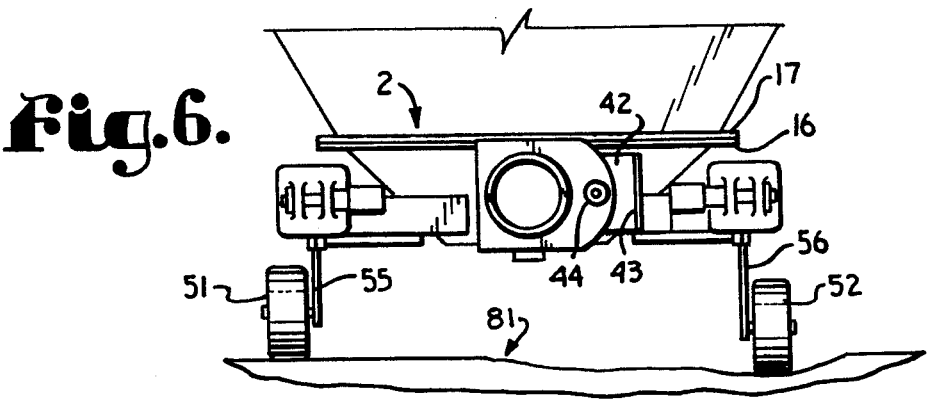

AIRLIFT RAILCAR DISCHARGE ADAPTOR

BACKGROUND OF THE INVENTION

The present invention relates to an airlift discharge adaptor for a pneumatic vacuum conveyor and more particularly to such an adaptor which can be wheeled into position beneath a discharge door of a railroad hopper car by a single workman to facilitate unloading of pulverulent and granular dry material from the railroad car.

The discharge of granular materials from railroad cars has long presented a variety of problems. Traditionally a dedicated railroad siding was needed, often including a sunken pit beneath the railroad track in which was installed a gravity or mechanically operated conveyor. It was often inconvenient or even impossible to locate a plant near enough to such a siding to use the bulk unloading capabilities thereof.

More recently, pressure-type and vacuum-type pneumatic conveyors have been developed in which an adaptor is attached to the discharge doors of the railroad car. One or more pneumatic hoses are attached to the adaptor and the material is gravity-fed into the adaptor and conveyed away in the hoses via an airstream directed therethrough. While such pneumatic conveyors have represented a pronounced improvement over the fixed mechanical or gravity conveyors in sunken pits, a number of problems remain.

Such adaptors tend to be large and bulky, often requiring several workmen to lift and install them onto a railroad car. In addition, these adaptors must be tightly fitted to the car hopper doors and rigidly connected thereto. This is because, as the material is off loaded, the railroad car becomes lighter, thus rising under the influence of the spring suspension. The adaptor must rise with the car while maintaining the seal so that the material can be continuously off-loaded without spillage of the material.

At least two prior art attempts have been made to produce an improved and more conveniently handled discharge adaptor.

In U.S. Pat. No. 2,813,640 to Loomis, a wheeled discharge adaptor is provided with a hydraulic jacking arrangement such that the adaptor can be wheeled beneath the railroad car and mechanically raised to meet the hopper door. The hydraulic jacks are equipped with a manually operated jack handle disposed on the opposite side of the railroad car from the maneuvering handle for the adaptor itself. Material from the car hopper doors is gravity fed down an inclined chute to a rotary airlock. The airlock is placed in a pneumatic pressure line for conveying the material from the airlock. The resulting adaptor, with the hydraulic jacks, rotary airlock and air-activated gravity flow chute, is a large, complicated and very heavy conveyance. Furthermore, in order to operate the jacks, a workman would first need to roll the adaptor under the railroad car and then cross to the other side of the car where he would manually raise the jacks to position the adaptor under the hopper doors. Should the position of the adaptor need to be adjusted during jacking, the workman would need to repeatedly cross from side to side of the car to first adjust the position and then commence jacking again.

In U.S. Pat. No. 5,125,771 to Herman et al., a wheeled adaptor is positionable under a railcar to be unloaded. As in the Loomis patent, a pair of manually operated jacks can then be manipulated to raise the adaptor into position in contact with the railcar hopper door. The jacks in the Herman patent are mechanically operated screw jacks, including rotary handles which are positioned beneath the railroad car, thus requiring a workman to crawl beneath the car and physically crank the adaptor into position. In addition, the workman must alternate from side to side of the adaptor to incrementally raise the respective jacks to prevent the adaptor from tipping. The adaptor includes a rotary auger-type conveyor which carries material out an elongate tube to a pressure pneumatic or vacuum conveyor, where it is conveyed away. Again, as in the Loomis adaptor, the Herman adaptor is a ponderous and heavy piece of machinery which requires a workman to wheel it into position and then raise it manually via a set of screw jacks to mate with a hopper door. Unlike Loomis, with the screw jacks of Herman, no self-correcting leveling is accomplished as the railroad car rises. Thus, a workman would need to constantly adjust the screw jacks as the car rose, again necessitating crawling beneath the car and alternating from side to side of the adaptor.

Accordingly, a need still exists for a simple and reliable airlift adaptor for connecting to a railroad car to off load material therefrom. Such an adaptor should be capable of operation by a single workman, should include easily operated lifting jacks which permit the workman to conveniently and reliably position the adaptor beneath a railroad car to be unloaded, to raise the adaptor into contact with the car hopper door(s) and to unload the railroad car, all from a single, preferably standing, position.

SUMMARY OF THE INVENTION

The present invention is directed to an airlift railcar discharge adaptor for connection to a railroad car for unloading pulverulent and granular material from the car. The adaptor includes a platform with a discharge chute mounted thereon and a pair of wheels for providing support and mobility. In one embodiment, the wheels can be swiveled to allow maneuvering of the adaptor from side to side. A horizontally oriented rectangular inlet connects with the chute and is adapted to be connected to the discharge doors on the railroad car. A handle is connected to the adaptor which allows a single workman to move and maneuver the adaptor while remaining in a standing position.

The two wheels are each connected to a respective jack assembly, each of which includes a bell crank, which is, in turn, connected to a respective pneumatically operated cylinder. Each pneumatic cylinder is connected to an independent control conveniently positioned proximate to the adaptor handle. The adaptor can be raised and lowered by manipulating the individual control levers, each of which is connected to a three-way valve for charging the associated pneumatic cylinder since each cylinder includes a double acting piston which allows rapid lowering of the adaptor. When the adaptor is in a raised position, continuing pneumatic pressure acting on each cylinder piston in a direction which urges the adaptor into contact with the discharge door also acts to keep the adaptor in continuous contact with the hopper door as the railcar rises due to material being unloaded.

OBJECTS AND ADVANTAGES OF THE INVENTION

The principal objects of the present invention include: to provide an improved airlift railcar discharge adaptor; to provide such an adaptor which includes a pair of wheels supporting a discharge chute; to provide such an adaptor with an elevated handle arranged such that a single workman can move and maneuver the adaptor from a standing position; to provide such an adaptor in which a discharge inlet is connected to the chute and is adapted for connection to a railcar hopper door; to provide such an adaptor in which each wheel is connected to an independently operated jack; to provide such an adaptor in which each jack includes a respective bell crank; to provide such an adaptor in which each bell crank is connected to a respective, independently controllable, pneumatic cylinder; to provide such an adaptor in which a respective pair of pneumatic control levers are mounted proximate the handle, with each lever controlling the supply of pneumatic air to a respective one of the cylinders; to provide such an adaptor in which the pneumatic cylinders are controllable to operate the respective bell cranks to raise and lower the adaptor via the connected wheels; to provide such an adaptor in which the wheels can be swiveled to facilitate close maneuvering; to provide such an adaptor which can be moved, maneuvered, raised and lowered by a single workman standing at a single control position; to provide such an adaptor in which pneumatic pressure in the cylinders will cause the adaptor to raise as the railcar rises during unloading, thus maintaining the inlet in contact with the railcar discharge outlet; to provide such an adaptor in which each side is independently height adjustable to permit its use on sloping or uneven surfaces; and to provide such a vehicle which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of an airlift railcar discharge adaptor being positioned beneath a railcar by a workman.

FIG. 2 is an enlarged side elevational view of the railcar adaptor positioned beneath the railcar discharge door, and with the wheels raised, thus lowering the adaptor.

FIG. 3 is an enlarged side elevational view of the railcar adaptor positioned beneath the railcar discharge door, and with the wheels lowered, thus raising the adaptor into contact with the railcar discharge door.

FIG. 4 is an enlarged top plan view of the railcar adaptor, with portions broken away to illustrate the right pneumatic cylinder and bell crank, and with portions of the right pneumatic supply lines shown in phantom.

FIG. 5 is an enlarged, cross-sectional view of the adaptor, taken along line 5—5 of FIG. 4, and illustrating the air and material flow within the adaptor.

FIG. 6 is an enlarged end elevational view of the adaptor, illustrating the adaptor positioned on an uneven surface and leveled by individually adjusting the wheels.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the reference numeral 1 generally designates an airlift railcar discharge adaptor in accordance with the present invention. The adaptor 1 is shown being positioned beneath a hopper discharge door 2 of a railcar 3. The railcar 3 is of the type which includes one or more hoppers containing granular or pulverulent material which is capable of being gravity fed through respective doors 2. The railcar 3 is shown supported by conventional railcar wheels 4 and 5 on a respective pair of rails 6 and 7.

The adaptor 1 includes a handle support 8 which extends upward at an angle which causes it to terminate in a handle support 9 positioned at a comfortable level for a single workman 10 to grasp a handle 11 while in a standing position. The adaptor 1 includes a discharge chute 12 which is connected at one end to a rectangular opening 13 positioned in a slanted side 14 of a flared discharge inlet 15. The top of the flared discharge inlet 15 terminates in a rectangular flange 16. The flange 16 is adapted to mate with and seal a corresponding flange 17 on the hopper door 2. The discharge chute 12 tapers from a rectangular cross-section at the end connected to the opening 13 to a circular cross-section at an opposite end 21. The circular end 21 is adapted to connect to a cylindrical pipe 22 which pipe 22 terminates in a grooved quick-connect connector 23 adapted to mate with a hose (not shown) for a vacuum-type pneumatic conveyor. A vertical pipe section 24 connects to the pipe 22 and an adjustable air inlet gate 25 is positioned in an opening at the top of the pipe section 24. The gate 25 can include a slide plate 26 adjusted by a slide handle 31 and held in a selected position by a set screw 32. A horizontally oriented cylindrical pipe section 33 is connected at one end to a slanted circular opening 34 in a second slanted side 35 of the flared discharge inlet 14. The pipe section 33 terminates in the opposite end in an additional adjustable air inlet gate 41, which can also comprise a slide gate 42 operated by a handle 43 and provided with a set screw 44 to lock it in a selected position.

A pair of wheels 51 and 52 are connected to respective jack assemblies 53 and 54. The jack assemblies 53 and 54 include corresponding bell cranks 55 and 56. The operation of the jack assembly 53 will now be described, it being understood that the jack assembly 54 is identical, although reversed. Referring to FIGS. 2 and 3, the bell crank 55 is pivotally connected to a the adaptor 1 at a pivot point 57. The bell crank 55 is also pivotally connected to an arm 61 of a pneumatic cylinder 62 via a U shaped connector and pin 63. The arm 61 is connected to a piston (not shown) within the cylinder 62, and extends and retracts as the piston moves in opposite directions in the cylinder 62, in a conventional fashion. The pneumatic cylinder 62 is illustrated as including a double acting piston which is operated by selectively introducing air under pressure into either end of the cylinder 62. An identical cylinder 64 is connected to the bell crank 56 on the opposite side. A pair of supply hoses 65 and 66 are connected from opposite ends of the cylinder 62 to a three way valve 71. The valve 71 is selectively operable via a handle 72 to connect compressed air from a supply hose 73 to one or the other of the hoses 65 and 66, or to neither of them. When the valve 71 is operated to connect compressed air into the hose 65, the cylinder 62 is charged from the right, thus moving the piston and the connected arm 61 to the left. This causes the connected bell crank 55 to pivot in a counterclockwise direction, as shown in FIGS. 1–3. Thus, the wheel is lowered, raising the adaptor 1 until the flange 16 encounters the flange 17 on the railcar discharge door 2. If the flange 16 is properly aligned with the discharge door flange 17, the adaptor 1 will be stably supported by the combination of the wheels 51 and 52 and the mating flanges 15 and 16. In order to lower the adaptor 1, the valve 71 is reversed, thus supplying pressurized air to the opposite side of the cylinder 62 via the hose 66, and forcing the piston and the connected arm 61 to the right. This causes the bell crank 55 to pivot clockwise, thus raising the wheel 51 and lowering the adaptor 1. The wheel 52 is independently raised and lowered in the same fashion by the jack 54 via a second three way valve 74 and associated handle 75 similarly controlling compressed air flow to the cylinder 64 from a supply line 76. It should be apparent that simultaneous operation of the jacks 53 and 54 is required to raise the adaptor 1 into the proper position.

Referring to FIG. 6, the adaptor 1 is shown positioned on an uneven surface 81, such as is often encountered in ballast between the rails of a railroad. By independently controlling the elevation of the wheels 51 and 52, the adaptor 1 can be properly mated with the discharge door 2 of the railcar 3, even when the supporting surface 81 is uneven.

Referring to FIG. 5, when additional maneuvering capability is required, the fixed wheels 51 and 52 can be replaced by a pair of free castering wheels 82, each provided with a flange 83 which is bolted to a corresponding flange 84. The flange 84 is directly connected to a bell crank 85. Thus, the adaptor 1, when equipped with the free castering wheels 82, can be adjusted from side to side while it is being positioned beneath the railcar 3.

OPERATION

When a loaded railcar, such as the railcar 3 in FIG. 1, must be unloaded, the adaptor 1 is wheeled into position beneath the discharge door 2 by the workman 10. A source of compressed air is then connected to an inlet 91 of a supply junction 92. The control levers 72 and 75 are then manipulated such that compressed air is supplied to the cylinders 62 and 64, thus lowering the wheels 51 and 52 and raising the adaptor 1 into the position shown in FIG. 3. If the free castering wheels 82 are used, small adjustments side to side are easily made by the workman 10 as the adaptor 1 is being raised. Once the flanges 16 and 17 are sealably engaged, a hose from a pneumatic vacuum operated conveyor (not shown) is attached to the connector 23 and the railcar discharge door 2 is opened via a slide gate or the like (not shown). The amount and direction of vacuum suction applied is controlled by adjusting the air inlet gates 25 and 41.

As the railcar 3 is unloaded, it becomes lighter, causing it to rise due to the action of a conventional spring suspension. The controls 72 and 75 are preferably adjusted to keep constant air pressure in the cylinders 62 and 64, urging the pistons to the left, which causes the adaptor 1 to automatically raise as the railcar 3 rises. Thus, the seal between the flanges 16 and 17 is maintained without requiring them to be bolted or otherwise rigidly attached. As long as the air from the air inlet gate 41 is properly adjusted, the entire railcar 3 can be unloaded by a single workman 10 without leaving the position shown in FIG. 1.

While the discharge adaptor 1 has been shown and described for use with a vacuum operated pneumatic conveyor, it should be recognized that its use is not so limited. With minor adaptations, a pressure conveyor or even a mechanical conveyor can be connected to the adaptor 1. Furthermore, the adaptor 1 has been illustrated and described as including two wheels, but the number of wheels could be increased if additional stability or support were needed. For example, a single support wheel could be positioned beneath the pipe 22 or the wheels 51 and 52 or 82 could be arrayed in tandem pairs, if desired. In addition, while the adaptor 1 has been shown as usable with a railcar 3, it should be apparent that any bottom discharge receptacle containing pulverulent or granular material can be unloaded in a similar fashion.

It is to be understood that while certain forms of the present invention have been illustrated and described herein, it is not to be limited to the specific forms or arrangement of parts described and shown.

What is claimed and desired to be secured by Letters Patent is as follows:

1. A discharge adaptor for connection to a receptacle for unloading material from said receptacle, comprising:
    (a) a discharge inlet adapted to be connected to a discharge outlet of said receptacle;
    (b) a discharge chute connected at one end to said discharge inlet and removably connectable at an opposite end to a conveyor;
    (c) a pair of wheels, each of which is connected to a respective side of said discharge inlet and chute to provide support and mobility therefore;
    (d) a handle connected to said discharge inlet and chute, said handle being positioned to allow a single workman to move and manipulate said adaptor from a standing position;
    (e) a pair of jacks with each said jack attached to a respective one of said wheels for selectively lowering and raising each of said wheels such that said adaptor can be raised and lowered thereby; and
    (f) control means including a pair of independent controls positioned proximate said handle for selectively and independently controlling respective ones of said jacks whereby said adaptor can be selectively raised and lowered and elevation adjusted from side to side by said workman while in said standing position.

2. A discharge adaptor as in claim 1, and further comprising:
    (a) a flange on said discharge inlet, said flange adapted to sealingly mate with said discharge outlet of said receptacle.

3. A discharge adaptor as in claim 2, wherein:
    (a) said adaptor can be selectively raised by said jacks and controls to a position in which said flange is sealingly engaged with said discharge outlet or lowered to a position in which said flange is disengaged from said discharge inlet.

4. A discharge adaptor as in claim 3, wherein:
(a) said wheels are free castering to facilitate maneuvering of said adaptor.

5. A discharge adaptor as in claim 1, wherein:
(a) said discharge chute changes in cross-section from a rectangular configuration at said discharge inlet connection to a circular configuration at said conveyor connection.

6. A discharge adaptor as in claim 1, wherein:
(a) said wheels are free castering to facilitate maneuvering of said adaptor.

7. A discharge adaptor as in claim 1, wherein:
(a) each of said jacks comprises a pneumatically operated cylinder connected to the corresponding wheel via a respective bell crank; and
(b) each of said controls comprises a valve which selectively provides compressed air to the pneumatic cylinder in the corresponding jack.

8. A discharge adaptor as in claim 7, wherein:
(a) each of said pneumatic cylinders comprises a double acting piston connected to the corresponding wheel via said respective bell crank; and
(b) each of said valves is a three-way valve which selectively provides said compressed air to either end of the pneumatic cylinder in the corresponding jack to selectively raise or lower the corresponding wheel.

9. A discharge adaptor as in claim 1, wherein:
(a) said discharge inlet is adapted to mate with a discharge outlet of a railcar to unload granular or pulverulent material therefrom.

10. A discharge adaptor as in claim 1, wherein:
(a) said opposite end of said discharge chute is connectable to a vacuum operated pneumatic conveyor.

11. A discharge adaptor as in claim 10, and further comprising:
(a) adjustable air inlet means for controlling the flow of ambient air into said adaptor.

12. A discharge adaptor as in claim 11, wherein:
(a) said adjustable air inlet means comprises two adjustable air inlet gates, one of which is connected to said discharge inlet and is positioned on the opposite side of said discharge inlet from said handle, and the other of which is connected to said discharge chute and is positioned on the same side of said discharge inlet from as said conveyor.

13. A discharge adaptor for connection to a receptacle for unloading material from said receptacle, comprising:
(a) a discharge inlet adapted to be connected to a discharge outlet of said receptacle;
(b) a discharge chute connected at one end to said discharge inlet and removably connectable at an opposite end to a conveyor;
(c) a pair of wheels, each of which is connected to a respective side of said discharge inlet and chute to provide support and mobility therefore;
(d) a handle connected to said discharge inlet and chute, said handle being positioned to allow a single workman to move and manipulate said adaptor from a standing position;
(e) a pair of independently controllable pneumatically operated jacks, with each jack connected to a respective one of said pair of wheels via a respective bell crank whereby each wheel can be separately raised and lowered thereby;
(f) a pair of control valves located proximate said handle for, respectively, selectively providing compressed air to a pneumatic cylinder in the corresponding jack.

14. A discharge adaptor as in claim 13, wherein:
(a) each of said pneumatic cylinders comprises a double acting piston connected to the corresponding wheel via said respective bell crank; and
(b) each of said valves is a three-way valve which selectively provides said compressed air to either end of the pneumatic cylinder in the corresponding jack to selectively raise or lower the corresponding wheel.

15. A discharge adaptor for connection to a receptacle for unloading material from said receptacle, comprising:
(a) a discharge inlet adapted to be connected to a discharge outlet of said receptacle;
(b) a discharge chute connected at one end to said discharge inlet and removably connectable at an opposite end to a vacuum operated pneumatic conveyor;
(c) a pair of wheels, each of which is connected to a respective side of said discharge inlet and chute to provide support and mobility therefore;
(d) a handle connected to said discharge inlet and chute, said handle being positioned to allow a single workman to move and manipulate said adaptor from a standing position;
(e) elevation means for selectively lowering and raising each of said wheels such that said adaptor can be raised and lowered thereby;
(f) control means positioned proximate said handle for controlling said elevation means whereby said adaptor can be selectively raised and lowered by said workman while in said standing position; and
(g) adjustable air inlet means comprising two adjustable air inlet gates, one of which is connected to said discharge inlet and is positioned on the opposite side of said discharge inlet from said handle, and the other of which is connected to said discharge chute and is positioned on the same side of said discharge inlet as said conveyor.

16. A discharge adaptor for connection to a railcar for unloading granular or pulverulent material from said railcar, comprising:
(a) a discharge inlet including a flange adapted to sealingly mate with a discharge outlet of said railcar;
(b) a discharge chute connected at one end to said discharge inlet and removably connectable at an opposite end to pneumatic conveyor;
(c) a pair of free castering wheels, each of which is connected to a respective side of said discharge inlet and chute to provide support and mobility for said adaptor;
(d) a handle connected to said discharge inlet and chute, said handle being positioned to allow a single workman to move and manipulate said adaptor from a standing position;
(e) elevation means for selectively lowering and raising each of said wheels such that said adaptor can be selectively raised to a position in which said flange sealingly engages said discharge opening or lowered to a position in which said discharge inlet is disengaged from said receptacle, respectively, said elevation means comprising two independently controllable jacks, with each jack connected to a respective one of said wheels whereby each wheel can be selectively separately raised and lowered thereby; and (f) control means positioned proximate said handle for controlling said elevation means, said control means comprising separate controls, each of which is connected to a respective one of said jacks to independently control the raising and lowering of the corresponding wheel whereby said adaptor can be selectively raised and lowered and elevation adjusted from side to side by said workman while in said standing position.

17. A discharge adaptor as in claim 16, wherein:
(a) each of said jacks comprises a pneumatically operated cylinder with a double acting piston connected to the corresponding wheel via a respective bell crank; and
(b) each of said controls comprises a three way valve which selectively provides compressed air to either end of the pneumatic cylinder in the corresponding jack to selectively raise or lower the corresponding wheel.

18. A discharge adaptor as in claim 16, wherein:
(a) said adaptor is connectable to a vacuum operated pneumatic conveyor.

19. A discharge adaptor as in claim 18, and further comprising:
(a) adjustable air inlet means comprising two adjustable air inlet gates, one of which is connected to said discharge inlet and is positioned on the opposite side of said discharge inlet from said handle, and the other of which is connected to said discharge chute and is positioned on the same side of said discharge inlet as said conveyor for selectively controlling the flow of ambient air into said adaptor.

20. A discharge adaptor as in claim 16, wherein:
(a) said discharge chute changes in cross-section from a rectangular configuration at said discharge inlet connection to a circular configuration at said conveyor connection.

21. A discharge adaptor for connection to a railcar for unloading granular or pulverulent material from said railcar, comprising:
(a) a discharge inlet including a flange adapted to sealingly mate with a discharge outlet of said railcar;
(b) a discharge chute connected at one end to said discharge inlet and removably connectable at an opposite end to a pneumatic conveyor;
(c) a pair of wheels, each of which is connected to a respective side of said discharge inlet and chute to provide support and mobility for said adaptor;
(d) a handle connected to said discharge inlet and chute, said handle being positioned to allow a single workman to move and manipulate said adaptor from a standing position;
(e) elevation means for selectively lowering and raising each of said wheels such that said adaptor can be selectively raised to a position in which said flange sealingly engages said discharge opening or lowered to a position in which said discharge inlet is disengaged from said receptacle, respectively, said elevation means comprising two independently controllable jacks, with each jack connected to a respective one of said wheels whereby each wheel can be selectively separately raised and lowered thereby;
(f) control means positioned proximate said handle for controlling said elevation means, said control means comprising separate controls, each of which is connected to a respective one of said jacks to independently control the raising and lowering of the corresponding wheel whereby said adaptor can be selectively raised and lowered by said workman while in said standing position.
(g) each of said jacks comprising a pneumatically operated cylinder with a double acting piston connected to the corresponding wheel via a respective bell crank; and
(h) each of said controls comprising a three way valve which selectively provides compressed air to either end of the pneumatic cylinder in the corresponding jack to selectively raise or lower the corresponding wheel.

22. A discharge adaptor as in claim 21, and further comprising:
(a) adjustable air inlet means comprising two adjustable air inlet gates, one of which is connected to said discharge inlet and is positioned on the opposite side of said discharge inlet from said handle, and the other of which is connected to said discharge chute and is positioned on the same side of said discharge inlet as said conveyor for selectively controlling the flow of ambient air into said adaptor.

* * * * *